(12) United States Patent
Surnilla et al.

(10) Patent No.: US 9,267,453 B2
(45) Date of Patent: Feb. 23, 2016

(54) LEARNING OF EGR VALVE LIFT AND EGR VALVE FLOW TRANSFER FUNCTION

(71) Applicant: Ford Global Technologies, LLC, Dearborn, MI (US)

(72) Inventors: Gopichandra Surnilla, West Bloomfield, MI (US); Daniel Joseph Styles, Canton, MI (US); James Alfred Hilditch, Canton, MI (US); Imtiaz Ali, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 288 days.

(21) Appl. No.: 13/973,672

(22) Filed: Aug. 22, 2013

(65) Prior Publication Data
US 2015/0053186 A1 Feb. 26, 2015

(51) Int. Cl.
| | | |
|---|---|---|
| *F02D 41/26* | (2006.01) | |
| *F02D 41/00* | (2006.01) | |
| *F02D 41/24* | (2006.01) | |
| *F02M 35/10* | (2006.01) | |
| *F02M 25/07* | (2006.01) | |
| *F02D 41/14* | (2006.01) | |
| *F02D 11/10* | (2006.01) | |

(52) U.S. Cl.
CPC ........ *F02D 41/0077* (2013.01); *F02D 41/0072* (2013.01); *F02D 41/2464* (2013.01); *F02M 25/0702* (2013.01); *F02M 25/0711* (2013.01); *F02M 25/0754* (2013.01); *F02M 25/0756* (2013.01); *F02M 35/10393* (2013.01); *F02D 41/1448* (2013.01); *F02D 41/1456* (2013.01); *F02D 2011/102* (2013.01); *F02D 2041/0017* (2013.01); *F02M 25/0727* (2013.01); *F02M 25/0749* (2013.01)

(58) Field of Classification Search
CPC ............ F02D 41/0077; F02D 41/0072; F02D 2041/0017; F02M 25/0702; F02M 25/0753; F02M 25/0749
USPC ........ 123/568.16, 568.21, 399; 701/103, 107, 701/108; 73/114.74
See application file for complete search history.

(56) References Cited

U.S. PATENT DOCUMENTS

| | | | |
|---|---|---|---|
| 4,614,175 A | 9/1986 | Asayama | |
| 4,790,286 A | 12/1988 | Nishida et al. | |
| 5,201,303 A | 4/1993 | Kojima | |
| 6,363,922 B1 | 4/2002 | Romzek et al. | |
| 6,837,227 B2 | 1/2005 | Jaliwala et al. | |
| 7,950,377 B2 | 5/2011 | Busato et al. | |
| 8,042,528 B2 * | 10/2011 | Gates et al. | ............. 123/568.21 |
| 8,108,128 B2 * | 1/2012 | Zurlo et al. | ................... 701/108 |
| 8,352,163 B2 | 1/2013 | Russ et al. | |
| 2008/0295513 A1 * | 12/2008 | Rollinger et al. | ............... 60/602 |

(Continued)

FOREIGN PATENT DOCUMENTS

| | | |
|---|---|---|
| EP | 0113161 A2 | 7/1984 |
| EP | 1808591 A2 | 7/2007 |
| WO | 2013030562 A1 | 3/2013 |

*Primary Examiner* — Hai Huynh
(74) *Attorney, Agent, or Firm* — Julia Voutyras; Alleman Hall McCoy Russell & Tuttle LLP

(57) ABSTRACT

Methods and systems are provided for improving accuracy of delta pressure over valve (DPOV) based EGR flow measurement during low valve lift conditions by learning errors in EGR valve lift and/or EGR valve flow transfer function.

19 Claims, 11 Drawing Sheets

(56) References Cited

U.S. PATENT DOCUMENTS

| | | |
|---|---|---|
| 2012/0318247 A1 | 12/2012 | Nogami |
| 2013/0061831 A1 | 3/2013 | Gambhir et al. |
| 2013/0073179 A1 | 3/2013 | Song et al. |
| 2014/0251287 A1* | 9/2014 | Takezoe .................. 123/568.11 |
| 2015/0101327 A1* | 4/2015 | Clark et al. ..................... 60/599 |

* cited by examiner

LEARNING OF EGR VALVE LIFT AND EGR VALVE FLOW TRANSFER FUNCTION

TECHNICAL FIELD

The present application relates to systems and methods for adjusting operation based on exhaust gas recirculation (EGR) valve leakage.

BACKGROUND AND SUMMARY

Engine systems may be equipped with exhaust gas recirculation systems that recirculate a portion of exhaust gas from an engine exhaust to an engine intake system to improve fuel economy and reduce regulated emissions. The recirculated exhaust gas may dilute the oxygen concentration of the intake air resulting in reduced combustion temperatures, and consequently, formation of nitrogen oxides in the exhaust may be reduced. In order to achieve improved engine operation and reduced emissions, a targeted EGR flow rate and air/fuel ratio may be maintained by adjusting engine actuators.

An EGR valve may be included in an exhaust gas recirculation path to control an amount of exhaust gas recirculated to achieve a desired air intake dilution. Turbocharged engine systems may include a low-pressure EGR (LP EGR) system which recirculates exhaust gas from the exhaust passage downstream of a turbine to the intake passage upstream of a turbocharger compressor. Accordingly, exhaust gas may be recirculated into a low-pressure air induction system (LP AIS) upstream of the compressor, resulting in a compressed mixture of fresh intake air and EGR downstream of the compressor.

EGR flow may be measured based on differential pressure across the EGR valve and a flow area determined by EGR valve lift. Errors in EGR flow measurement may lead to reduced fuel economy, decreased engine performance and increased emission. Therefore, EGR flow must be monitored and controlled during engine operation to provide optimal EGR, and air/fuel mixture for combustion. One example approach for controlling EGR flow rate is illustrated by Song et al. in US 2012/0073179 A1. In Song et al., a first EGR flow rate is estimated based on oxygen concentration at the intake and a second EGR flow rate is estimated based on engine speed and engine load. Based on differences between the two flow rates, a fault in the EGR system is indicated.

However, the inventors herein have identified issues with such systems. For example, in determining EGR flow, Song does not take into account changes in valve lift or valve area which may occur due to soot build up at the EGR valve. Non-uniform soot build-up may lead to changes in effective valve area, which may result in EGR measurement errors. Consequently, delays and insufficiencies in EGR flow may occur, which in turn may result in degraded fuel economy, engine performance and emission.

Therefore, in one example, some of the above issues may be at least partially addressed by a method for an engine, comprising: closing an exhaust gas recirculation (EGR) valve; reducing an intake throttle opening until a differential pressure across the closed EGR valve reaches a threshold; and while the differential pressure is maintained, learning an EGR leakage flow correction based on intake oxygen and adjusting the EGR valve during open EGR valve operation based on operating parameters and the EGR leakage flow correction.

In another example, a method for an engine may comprise: reducing an opening of an intake throttle while closing an EGR valve; and estimating an EGR valve leak area based on an intake manifold oxygen sensor located upstream of the throttle. The method may further comprise correcting an EGR flow rate based on the estimated EGR valve leak area.

In still another example, a method for an engine may comprise reducing an opening of an intake throttle while adjusting the lift of an EGR valve; and learning the transfer function of EGR flow versus valve lift based on an intake manifold oxygen sensor located in the diluted air flow stream. The method may further comprise correcting an EGR flow rate based on the learned transfer function.

In this way, methods for an engine control system may be provided to accurately learn the changes in EGR valve lift and adjust the flow rate based on the valve lift. By learning the effective leaking area of the EGR valve during valve-closed conditions, and/or by learning the differential pressure transfer function during different valve lift conditions, adjustments to the effective EGR valve area may be performed. As a result, more accurate EGR flow measurements may be obtained and consequently, improved fuel economy, improved engine performance and reduced emissions may be obtained. Further, a change in EGR flow from a nominal flow may be calculated by utilizing the learned leak area and transfer function. Upon determining that the change in EGR flow is greater than a threshold change, EGR valve degradation may be indicated. By determining EGR valve degradation based on the learned leak area and/or transfer function, more accurate leak diagnostics may be obtained and more accurate control of EGR may be achieved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings.

DETAILED DESCRIPTION

Figure 5:
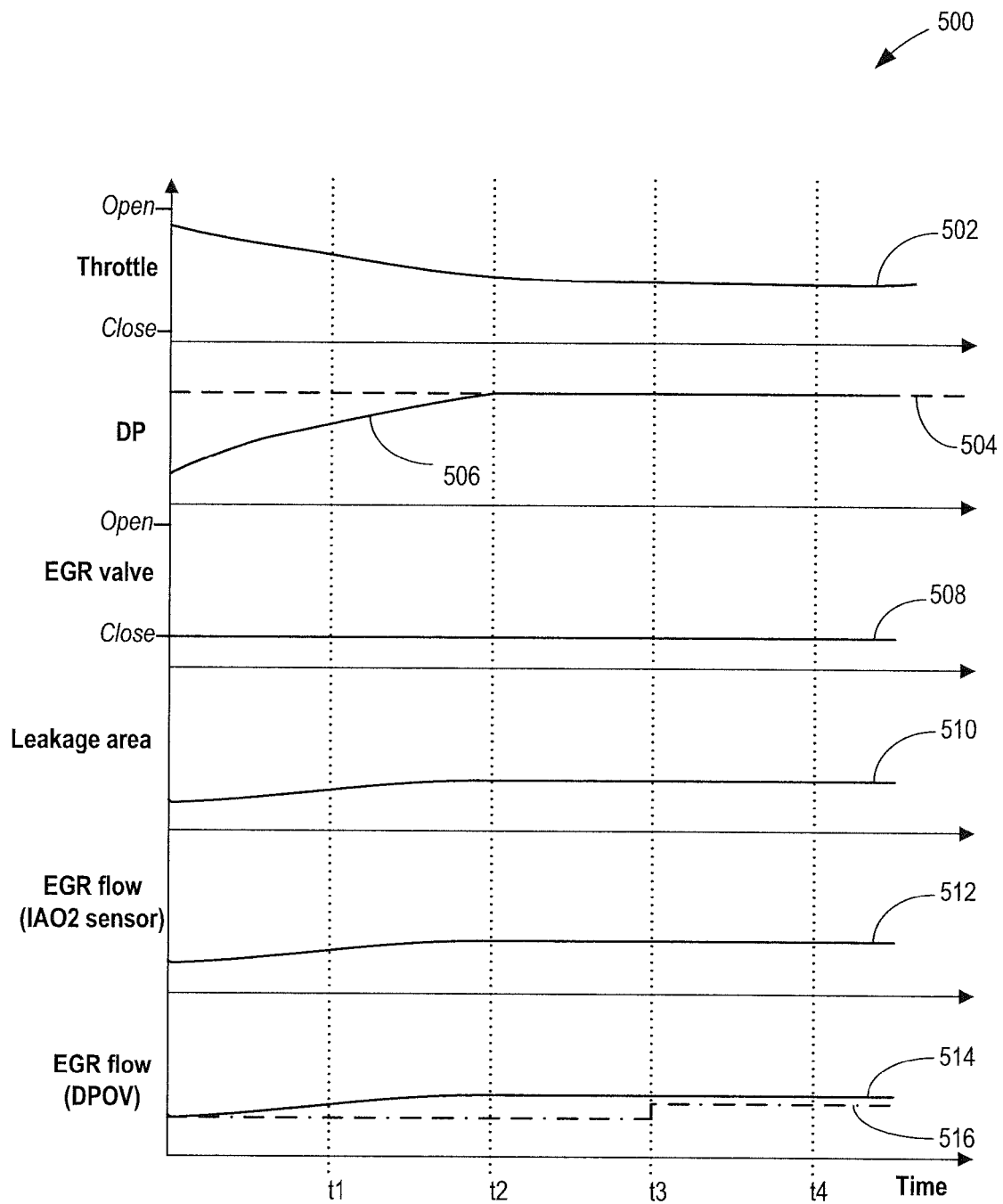
FIGS. 5 and 6 show example learning processes for EGR measurement by DPOV.
Figure 6:
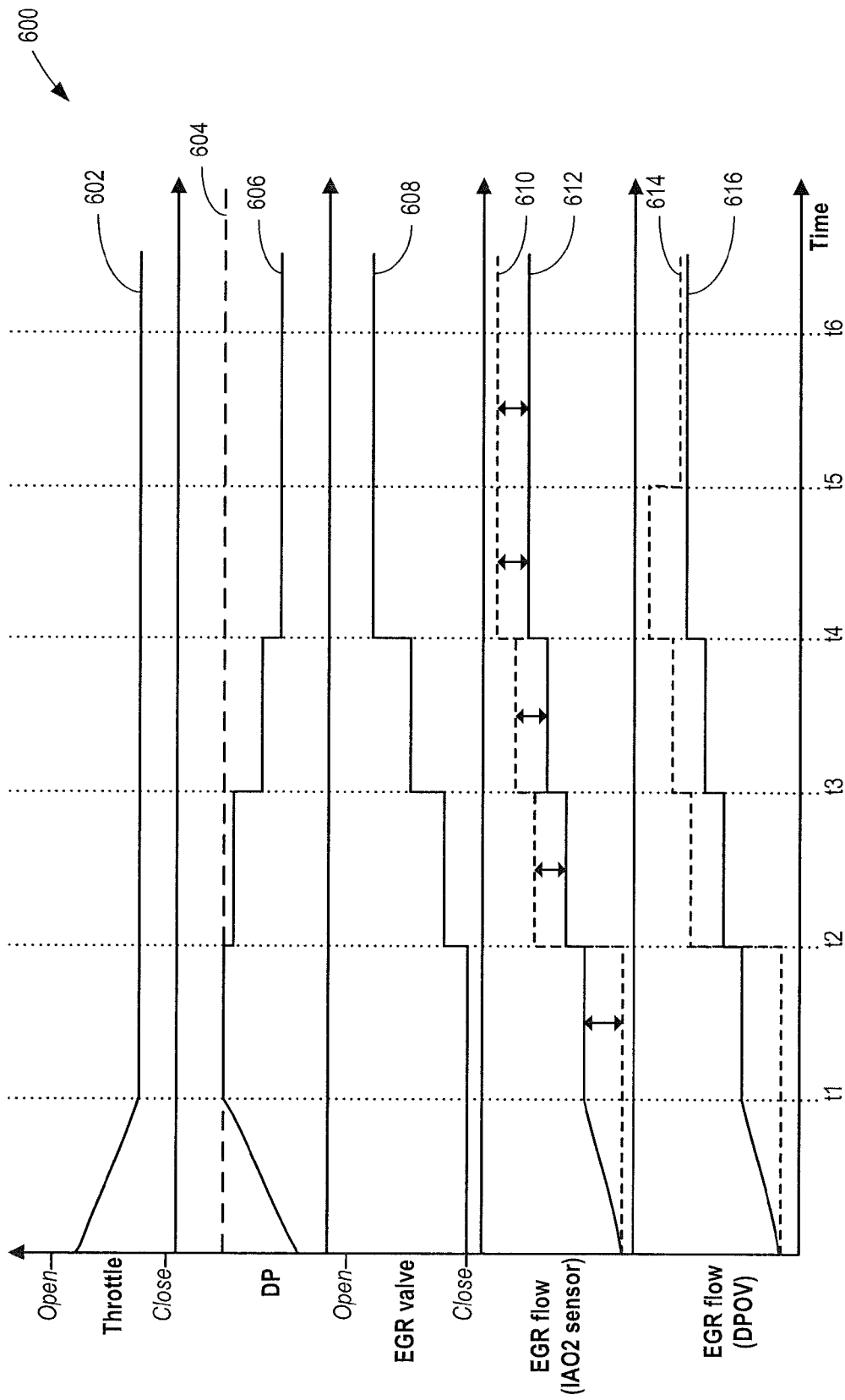
Figure 7:
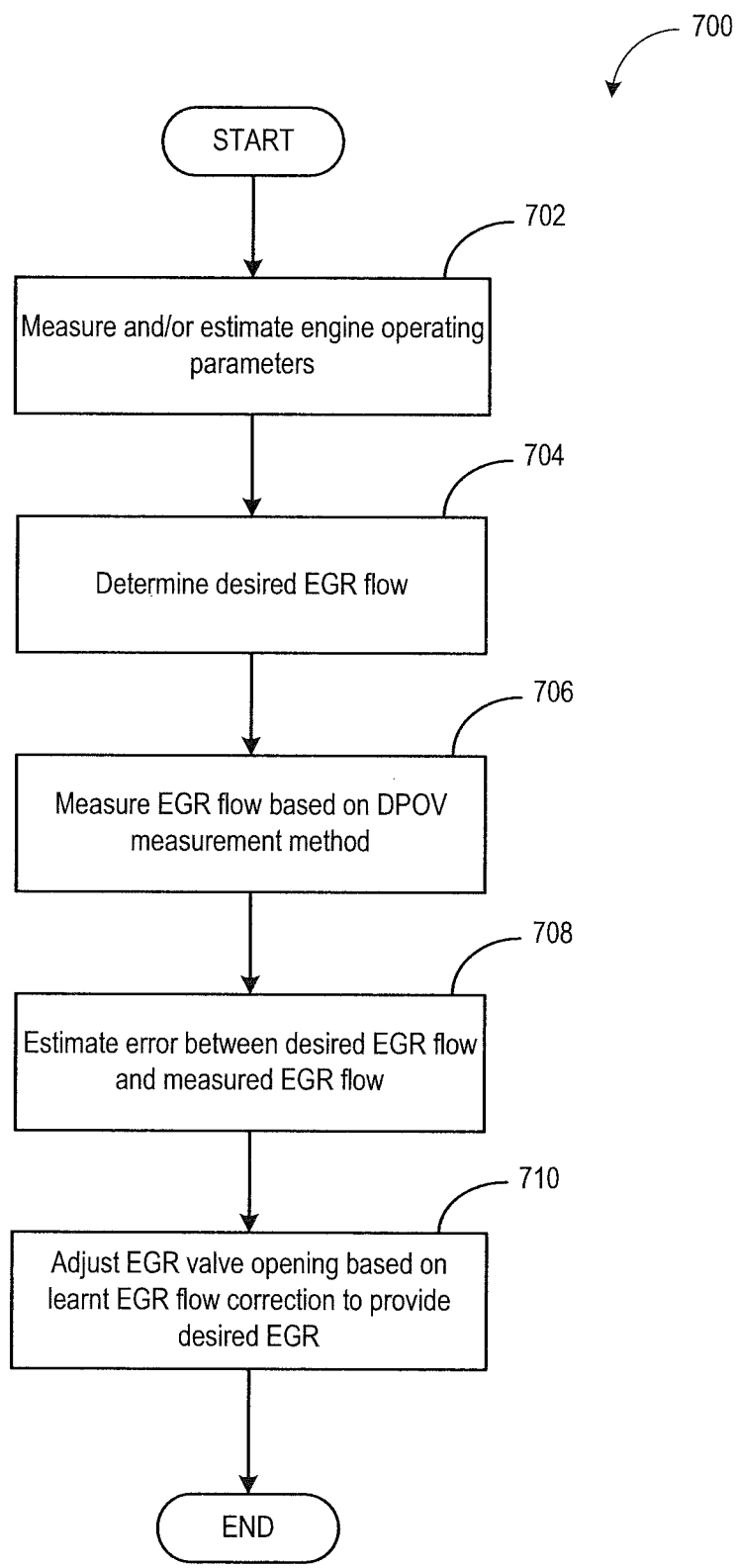
FIG. 7 shows a flowchart illustrating application of learned EGR flow correction to supply desired EGR during engine operation.

Methods and systems are provided for increasing the accuracy of EGR flow measurement determined based on a delta pressure over valve (DPOV) measurement system in an engine system (such as engine system of FIG. 1) by learning errors in EGR flow. Based on signals from an EGR system, as shown at FIG. 2, a DPOV measurement method may be implemented to determine EGR flow. Soot build-up may cause errors in EGR valve lift leading to errors in EGR flow measurement by DPOV. A controller may perform a routine such as the routine at FIG. 3C to determine EGR valve leakage rate during closed EGR valve conditions. The EGR leakage rate thus obtained may be utilized for EGR valve diagnostics as described at FIG. 3A, and to correct an effective EGR flow area for EGR flow measurements as described at FIG. 3B. Further, the controller may perform a routine such as the routine at FIG. 4C to determine DPOV transfer function that may allow learning of changes in EGR valve flow characteristics at different valve lift positions. The determined transfer function may be utilized for EGR valve diagnostics as described at FIG. 4A, and to correct an effective EGR flow area for EGR flow measurement and accurate control as described at FIG. 4B. An example learning of EGR valve leakage rate is shown at FIG. 5. An example learning of DPOV transfer function is shown at FIG. 6. The learned EGR flow correction based on EGR valve leakage rate and DPOV transfer function may be utilized to provide a desired EGR during engine operations as illustrated at FIG. 7.

Figure 1:
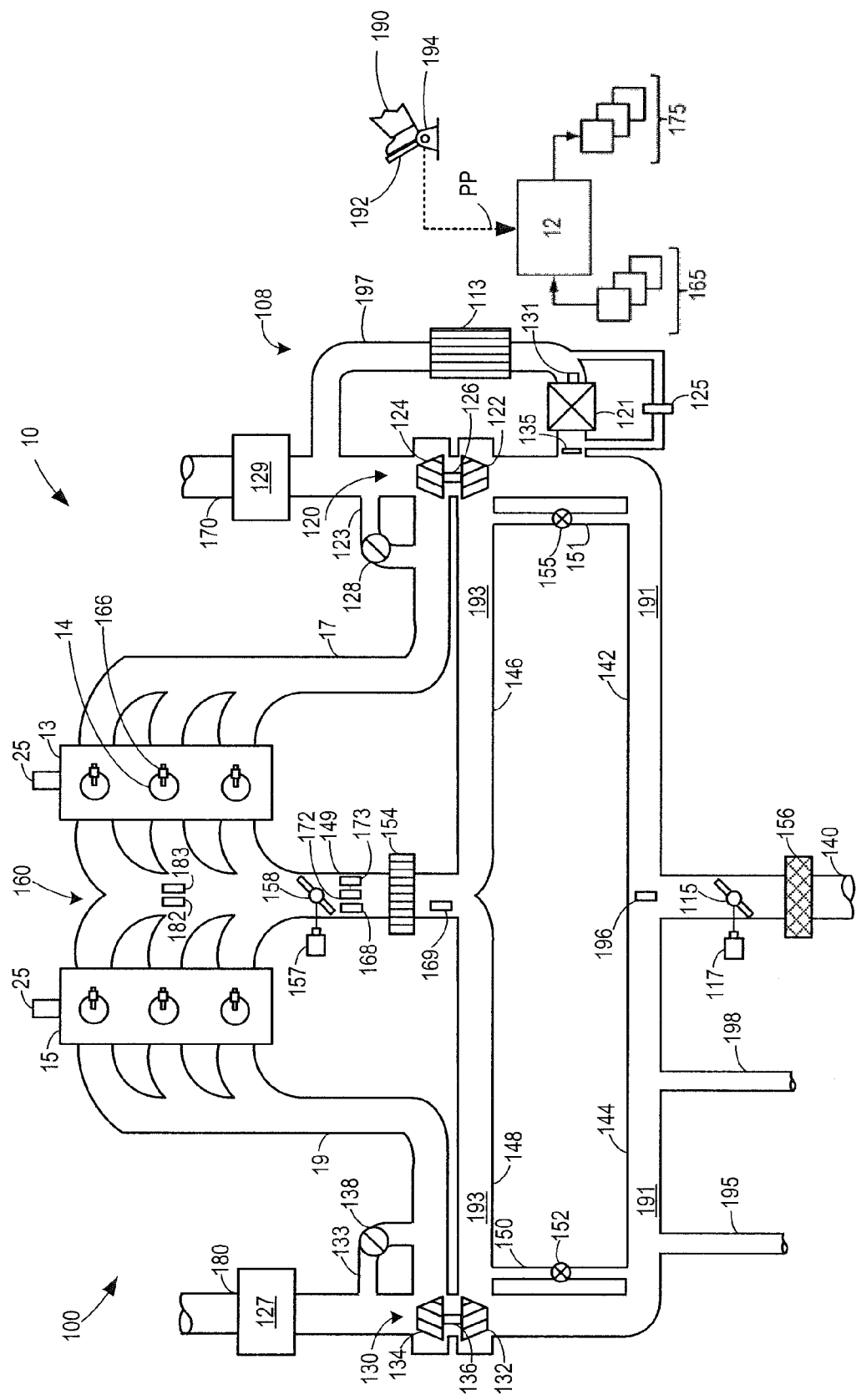
FIG. 1 shows a schematic diagram of a twin-turbocharged engine system, including a low pressure EGR system and an intake oxygen sensor
Figure 2:
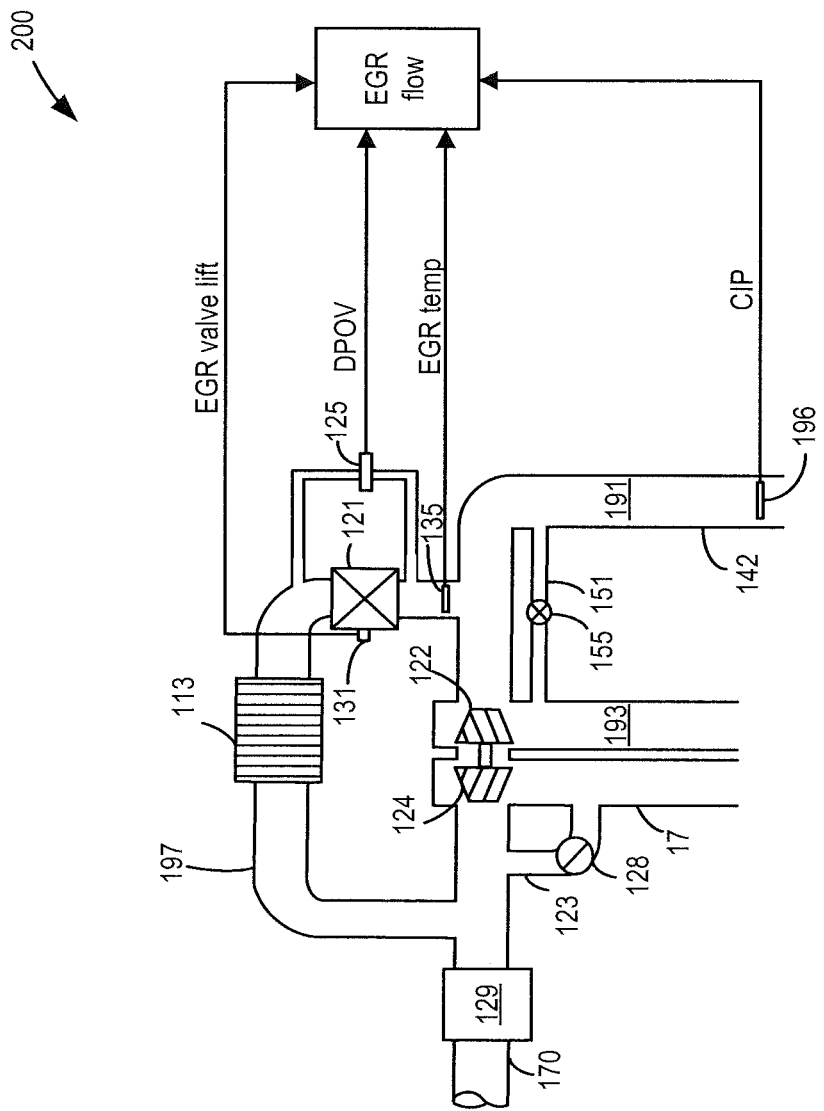
FIG. 2 shows a schematic diagram of the low pressure EGR system of the twin-turbocharged engine system shown at FIG. 1, including signals from the LP EGR system that may be used to determine EGR flow rate.

FIG. 1 shows a schematic depiction of an example turbocharged engine system 100 including a multi-cylinder internal combustion engine 10 and twin turbochargers 120 and 130, which may be identical. As one non-limiting example, engine system 100 can be included as part of a propulsion system for a passenger vehicle. While not depicted herein, other engine configurations such as an engine with a single turbocharger may be used without departing from the scope of this disclosure.

Engine system 100 may be controlled at least partially by a controller 12 and by input from a vehicle operator 190 via an input device 192. In this example, input device 192 includes an accelerator pedal and a pedal position sensor 194 for generating a proportional pedal position signal PP. Controller 12 may be a microcomputer including the following: a microprocessor unit, input/output ports, an electronic storage medium for executable programs and calibration values (e.g., a read only memory chip), random access memory, keep alive memory, and a data bus. The storage medium read-only memory may be programmed with computer readable data representing non-transitory instructions executable by the microprocessor for performing the routines described herein as well as other variants that are anticipated but not specifically listed. Controller 12 may be configured to receive information from a plurality of sensors 165 and to send control signals to a plurality of actuators 175 (various examples of which are described herein). Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. Example control routines are described herein with regard to FIGS. 3A-4C.

Engine system 100 may receive intake air via intake passage 140. As shown at FIG. 1, intake passage 140 may include an air filter 156 and an air induction system (AIS) throttle 115. AIS throttle 115 may be configured to adjust and control the amount of LP EGR flow. In one example, the AIS throttle may be adjusted to set a desired differential pressure across an EGR valve 121. The position of AIS throttle 115 may be adjusted by the control system via a throttle actuator 117 communicatively coupled to controller 12.

At least a portion of the intake air may be directed to a compressor 122 of turbocharger 120 via a first branch of the intake passage 140 as indicated at 142 and at least a portion of the intake air may be directed to a compressor 132 of turbocharger 130 via a second branch of the intake passage 140 as indicated at 144. Accordingly, engine system 100 includes a low-pressure AIS system 191 upstream of compressors 122 and 132, and a high-pressure AIS system 193 downstream of compressors 122 and 132.

A positive crankcase ventilation (PCV) conduit 198 may couple a crankcase (not shown) to the second branch 144 of the intake passage such that gases in the crankcase may be vented in a controlled manner from the crankcase. Further, evaporative emissions from a fuel vapor canister (not shown) may be vented into the intake passage through a fuel vapor purge conduit 195 coupling the fuel vapor canister to the second branch 144 of the intake passage.

The first portion of the total intake air can be compressed via compressor 122 where it may be supplied to intake manifold 160 via intake air passage 146. Thus, intake passages 142 and 146 form a first branch of the engine's air intake system. Similarly, a second portion of the total intake air can be compressed via compressor 132 where it may be supplied to intake manifold 160 via intake air passage 148. Thus, intake passages 144 and 148 form a second branch of the engine's air intake system. As shown at FIG. 1, intake air from intake passages 146 and 148 can be recombined via a common intake passage 149 before reaching intake manifold 160, where the intake air may be provided to the engine. In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. In the depicted example, intake passage 149 also includes an air cooler 154 and a throttle 158. The position of throttle 158 may be adjusted by the control system via a throttle actuator 157 communicatively coupled to controller 12. As shown, throttle 158 may be arranged in intake passage 149 downstream of air cooler 154, and may be configured to adjust the flow of an intake gas stream entering engine 10.

As shown at FIG. 1, a compressor bypass valve (CBV) 152 may be arranged in CBV passage 150 and a CBV 155 may be arranged in CBV passage 151. In one example, CBVs 152 and 155 may be electronic pneumatic CBVs (EPCBVs). CBVs 152 and 155 may be controlled to enable release of pressure in the intake system when the engine is boosted. An upstream end of CBV passage 150 may be coupled with intake passage 144 upstream of compressor 132, and a downstream end of CBV passage 150 may be coupled with intake passage 148 downstream of compressor 132. Similarly, an upstream end of a CBV passage 151 may be coupled with intake passage 142 upstream of compressor 122, and a downstream end of CBV passage 151 may be coupled with intake passage 146 downstream of compressor 122. Depending on a position of each CBV, air compressed by the corresponding compressor may be recirculated into the intake passage upstream of the compressor (e.g., intake passage 144 for compressor 132 and intake passage 142 for compressor 122). For example, CBV 152 may open to recirculate compressed air upstream of compressor 132 and/or CBV 155 may open to recirculate compressed air upstream of compressor 122 to release pressure in the intake system during selected conditions to reduce the effects of compressor surge loading. CBVs 155 and 152 may be either actively or passively controlled by the control system.

As shown, a LP AIS pressure sensor 196 is arranged at a juncture of intake passages 140, 142, and 144, and an HP AIS pressure sensor 169 is arranged in intake passage 149. However, in other anticipated embodiments, sensors 196 and 169 may be arranged at other locations within the LP AIS and HP AIS, respectively. Among other functions, measurements from LP AIS pressure sensor 196 and HP AIS pressure sensor 169 may be used to determine compressor pressure ratio, which may in factor into an estimate of compressor surge risk.

Engine 10 may include a plurality of cylinders 14. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 3, 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted from via bank-specific exhaust passages. In the depicted example, a first bank 13 of cylinders of engine 10 can exhaust products of combustion via a common exhaust passage 17 and a second bank 15 of cylinders can exhaust products of combustion via a common exhaust passage 19.

The position of intake and exhaust valves of each cylinder 14 may be regulated via hydraulically actuated lifters coupled to valve pushrods, or via mechanical buckets in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation. In still another alternative embodiment, the cams may not be adjustable.

Products of combustion that are exhausted by engine 10 via exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. The position of wastegate 128 may be controlled by an actuator (not shown) as directed by controller 12. As one non-limiting example, controller 12 can adjust the position of the wastegate 128 via a solenoid valve. In this particular example, the solenoid valve may receive a pressure difference for facilitating the actuation of wastegate 128 via the actuator from the difference in air pressures between intake passage 142 arranged upstream of compressor 122 and intake passage 149 arranged downstream of compressor 122. In other examples, other suitable approaches other than a solenoid valve may be used for actuating wastegate 128.

Similarly, products of combustion that are exhausted by engine 10 via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gases flowing through exhaust passage 19 can bypass turbine 134 via turbine bypass passage 133 as controlled by wastegate 138. The position of wastegate 138 may be controlled by an actuator (not shown) as directed by controller 12. As one non-limiting example, controller 12 can adjust the position of wastegate 138 via a solenoid valve. In this particular example, the solenoid valve may receive a pressure difference for facilitating the actuation of wastegate 138 via the actuator from the difference in air pressures between intake passage 144 arranged upstream of compressor 132 and intake passage 149 arranged downstream of compressor 132. In other examples, other suitable approaches other than a solenoid valve may be used for actuating wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators.

Products of combustion exhausted by the cylinders via exhaust passage 19 may be directed to the atmosphere via exhaust passage 180 downstream of turbine 134, while combustion products exhausted via exhaust passage 17 may be directed to the atmosphere via exhaust passage 170 downstream of turbine 124. Exhaust passages 170 and 180 may include one or more exhaust after-treatment devices, such as a catalyst, and one or more exhaust gas sensors. For example, as shown at FIG. 1, exhaust passage 170 may include an emission control device 129 arranged downstream of the turbine 124, and exhaust passage 180 may include an emission control device 127 arranged downstream of the turbine 134. Emission control devices 127 and 129 may be selective catalytic reduction (SCR) devices, three way catalysts (TWC), $NO_X$ traps, various other emission control devices, or combinations thereof. Further, in some embodiments, during operation of the engine 10, emission control devices 127 and 129 may be periodically reset by operating at least one cylinder of the engine within a particular air/fuel ratio, for example.

Engine system 100 further includes a low-pressure (LP) EGR system 108. LP EGR system 108 routes a desired portion of exhaust gas from exhaust passage 170 to intake passage 142. In the depicted embodiment, EGR is routed in an EGR passage 197 from downstream of turbine 124 to intake passage 142 at a mixing point located upstream of compressor 122. The amount of EGR provided to intake passage 142 may be varied by the controller 12 via EGR valve 121 coupled in the LP EGR system 108. In the example embodiment shown at FIG. 1, LP EGR system 108 includes an EGR cooler 113 positioned upstream of EGR valve 121. EGR cooler 113 may reject heat from the recirculated exhaust gas to engine coolant, for example. In an alternate embodiment, the engine system may include a second LP EGR system (not shown) that routes a desired portion of exhaust gas from exhaust passage 180 to intake passage 144. In another alternate embodiment, the engine system may include both the LP EGR systems (one routing exhaust gas from exhaust passage 180 to intake passage 144, and another routing exhaust gas from exhaust passage 170 to intake passage 142) described above.

EGR valve 121 may be configured to adjust an amount and/or rate of exhaust gas diverted through the corresponding EGR passages to achieve a desired EGR dilution percentage of the intake charge entering the engine, where an intake charge with a higher EGR dilution percentage includes a higher proportion of recirculated exhaust gas to air than an intake charge with a lower EGR dilution percentage. In addition to the position of the EGR valves, it will be appreciated that AIS throttle position, and other actuators may also affect the EGR dilution percentage of the intake charge. As an example, AIS throttle position may affect the flow of fresh air into the intake system; more fresh air flow into the intake system may decrease the EGR dilution percentage, whereas less fresh air flow into the intake system may increase the EGR dilution percentage. Accordingly, EGR dilution of the intake charge may be controlled via control of one or more of EGR valve position and AIS throttle position among other parameters.

The EGR dilution percentage of the intake charge at a given time (e.g., the proportion of combusted gases to air in an intake passage of the engine) may be inferred from the output of an intake oxygen sensor 168. In the depicted embodiment, the intake oxygen sensor is positioned downstream of air cooler 154. However, in other embodiments, sensor 168 may be arranged at a juncture of intake passages 146, 148, and 149 and upstream of air cooler 154 or at another location along intake passage 149. Intake oxygen sensor (IAO2) 168 may be any suitable sensor for providing an indication of the oxygen concentration of the intake charge, such as a linear oxygen sensor, intake UEGO (universal or wide-range exhaust gas oxygen) sensor, two-state oxygen sensor, etc. Controller 12 may estimate the percent dilution of the EGR flow based on feedback from intake oxygen sensor 168. In some examples, the controller may then adjust one or more of EGR valve 121, AIS throttle 115, or other actuators to achieve a desired EGR dilution percentage of the intake charge.

In one example, an EGR flow rate may be estimated based on a differential pressure over valve (DPOV) system which includes a differential pressure sensor 125 that detects a pressure difference between an upstream region of EGR valve 121 and a downstream region of EGR valve 121. EGR flow rate determined by the DPOV system may be further based on an EGR temperature detected by an EGR temperature sensor 135 located downstream of EGR valve 121, and an area of EGR valve opening detected by an EGR valve lift sensor 131. In another example, EGR flow rate may be determined based on outputs from an EGR measurement system that includes intake oxygen sensor 168, mass air flow sensor (not shown), manifold absolute pressure sensor 182 and manifold temperature sensor 183. In some examples, both the EGR measurement systems (that is, the DPOV system including differential pressure sensor 125, and the EGR measurement system including intake oxygen sensor 168) may be used to determine, monitor and adjust EGR flow rate.

Further, it will be appreciated that in alternative embodiments, engine 10 may include one or more high pressure (HP) EGR systems as well as the LP EGR system, to divert at least some exhaust gas from the engine exhaust passages upstream of the turbines, to the engine intake downstream of the compressors.

Engine system 100 may include various sensors 165, in addition to those mentioned above. As shown in FIG. 1, common intake passage 149 may include a throttle inlet pressure (TIP) sensor 172 for estimating a throttle inlet pressure (TIP) and/or a throttle inlet temperature sensor 173 for estimating a throttle air temperature (TCT), each communicating with controller 12. Further, while not depicted herein, each of intake passages 142 and 144 can include a mass air flow sensor.

Turning to FIG. 2, a schematic of LP EGR valve assembly and the signals for determining EGR flow based on DPOV EGR flow measurement system is illustrated. EGR mass flow rate may be determined utilizing a DPOV measurement system based on an area of opening of the EGR valve (which may be calculated from EGR valve lift), differential pressure across the EGR valve, temperature of EGR, and pressure downstream of EGR valve.

EGR valve 121, located in the EGR passage 197 downstream of turbine 124 and upstream of compressor 122, may be adjusted by the controller to allow a desired amount of EGR into the intake passage 142. EGR mass flow rate through the EGR valve may be calculated based on an EGR valve lift signal from the EGR valve lift sensor 131 that determines an amount of opening of the EGR valve, an EGR temperature signal from an EGR temperature sensor 135 that determines EGR temperature, a differential pressure (DP) signal from a differential pressure sensor 125 that detects a differential pressure across the EGR valve 121, and a downstream pressure signal from LP AIS pressure sensor 196 that detects a pressure downstream of the EGR valve. In the example depicted herein, EGR temperature sensor is located downstream of EGR valve 121. In some examples, EGR temperature sensor may be located upstream of EGR valve 121.

The controller may receive EGR valve lift, DP, EGR temperature, and downstream pressure signals from the respective sensors as discussed above to determine EGR mass flow rate based on DPOV measurement system. The determined EGR flow rate may be utilized in a feedback circuit to adjust EGR flow, for example, by controlling an amount of EGR valve lift. However, build-up of soot at the EGR valve may result in an error in the EGR valve lift amount. For example, upon accumulation of soot, EGR valve area may be smaller than the EGR valve area when the EGR valve is free of soot build-up. Under such conditions, if EGR valve area is not adjusted for soot build-up, EGR flow measurement may be incorrect. Therefore, in one example, IAO2 sensor measurement system may be utilized to determine EGR flow rate and the determined EGR flow rate may be utilized to learn an error in EGR valve lift. In one example, as elaborated at FIG. 3B, EGR valve lift may be adjusted based on the learned error in valve lift (such as valve lift errors due to soot build-up) to determine a more accurate EGR flow rate. In another example, as elaborated at FIG. 4B, EGR valve lift may be adjusted based on DPOV transfer function, for example, during conditions when valve lift error may not be above a threshold (that is, when valve lift error is small).

In this way, EGR flow may be determined based on signals from the EGR system and corrected by adjusting EGR valve lift based on determined errors in EGR valve lift.

As discussed above, in a DPOV based EGR measurement system, an error in EGR valve lift may be translated into an error in EGR flow measurement. In one example, error in EGR valve lift may be determined based on EGR leakage rate at closed EGR valve positions. Determination of EGR valve leakage rate will be further elaborated at FIG. 3C. In one example, as described further at FIG. 3A, EGR valve leakage rate may be utilized for EGR valve diagnostics. In another example, as described further at FIG. 3B, EGR valve leakage rate may be utilized for improving accuracy of EGR flow measurements when EGR flow is determined based on DPOV measurement method.

Figure 3A:
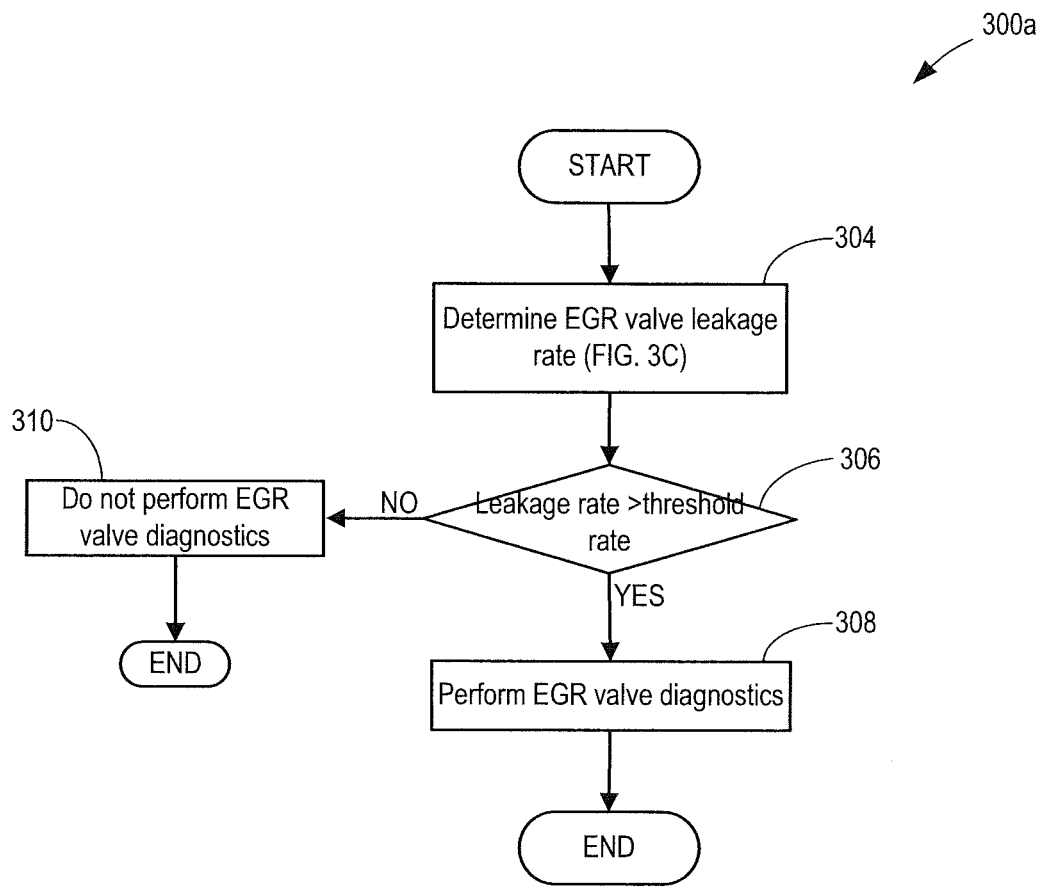
FIG. 3A shows a flowchart illustrating a routine for performing EGR valve diagnostics based on EGR leakage rate.

Turning to FIG. 3A, it shows a routine 300a for determining EGR valve defect based on EGR valve leakage rate.

At 304, the controller may determine EGR valve leakage rate based on EGR flow measured by the IAO2 sensor and differential pressure across the EGR valve. Details of leakage rate determination will be further elaborated at FIG. 3C. Upon determining the EGR valve leakage rate, the routine may proceed to 306 where it may be determined if an EGR valve leakage rate is greater than a predetermined threshold rate. If yes, it may be indicated that a leak is present at the EGR valve and at 308, the routine may perform additional EGR valve diagnostics to confirm the presence of EGR valve leak. In one example, EGR flow determined by the IAO2 sensor may be utilized for EGR valve diagnostics. Upon confirming the EGR valve leak, the vehicle operator may be notified of presence of leak (via an on-board display, for example) and may be prompted to take necessary steps to repair the leak. If the leakage rate is not greater than the threshold rate, no leak may be indicated and additional EGR valve diagnostics may not be performed.

In this way, EGR valve leakage flow may be determined based on at least an output from the IAO2 sensor. Further, based on the EGR leakage rate being greater than the threshold rate, EGR valve diagnostics may be performed.

Figure 3B:
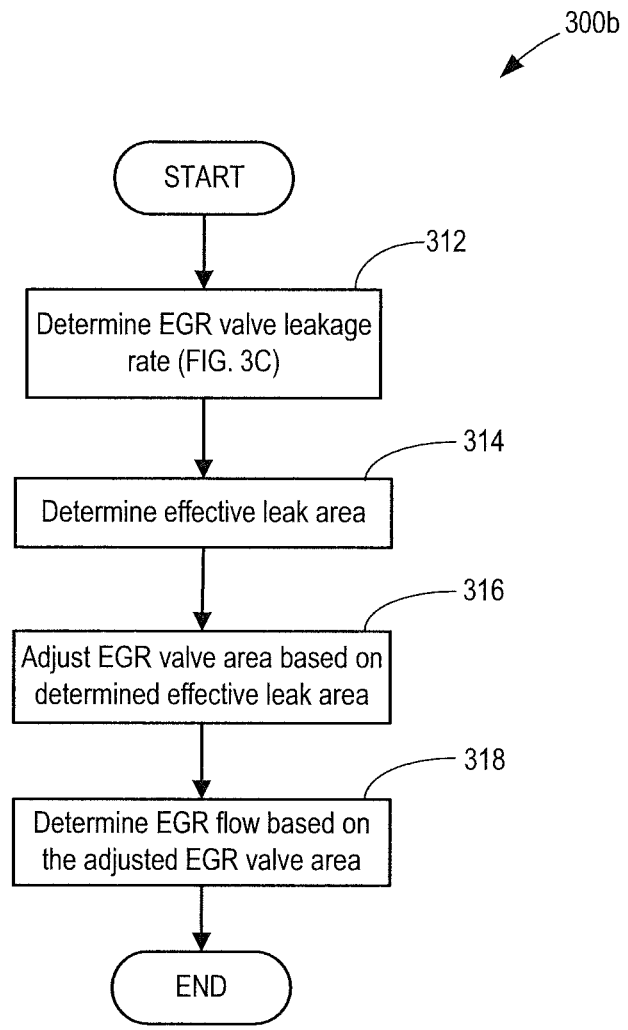
FIG. 3B shows a flowchart illustrating a routine for determining EGR flow based on EGR leakage rate

Turning to FIG. 3B, it shows a routine 300b for determining EGR flow based on EGR valve leakage rate. For example, based on EGR valve leakage rate, an estimated EGR flow measured by a DPOV measurement system may be adjusted to determine more accurate EGR flow.

At 312, EGR valve leakage rate may be determined. The EGR valve leakage rate may be determined based on EGR flow measured by IAO2 sensor measurement system and DP across the EGR valve. Details of EGR valve leakage rate determination will be further elaborated at FIG. 3C.

Next at 314, upon determining EGR valve leakage rate, an effective valve leak area may be determined. EGR valve may leak due to accumulation of soot and/or corrosion, for example. In one example, un-burnt fuel and oil in the exhaust gas may cause build-up of soot particles. As a result, EGR valve may not close completely and consequently, EGR flow may not be completely stopped even during conditions when the EGR valve is in a closed position. In other words, a portion of EGR may leak through the EGR valve. In some examples, corrosion of the EGR valve may also cause EGR leakage through the EGR valve. The EGR valve leakage rate may be determined based on EGR flow through a closed EGR valve as measured by an IAO2 sensor at a predetermined differential pressure across the EGR valve. Based on the EGR flow (or EGR leakage) through the closed EGR valve, an effective leakage area may be determined. In other words, an area of an opening in the closed EGR valve through which EGR may be leaking may be determined.

EGR mass flow rate ($\dot{m}_{EGR}$) may be defined as a function of an area of the opening (A), a temperature of the EGR flow ($T_{EGR}$), a differential pressure across the valve (DP), and a pressure downstream of the EGR valve ($P_d$). That is, $$\dot{m}_{EGR} = f((A),(T_{EGR}),(P_d),(DP))$$

EGR mass flow rate may be determined based on an output from the IAO2 sensor, EGR temperature may be determined based on an output from a temperature sensor located downstream of the EGR valve, differential pressure may be determined based on an output from a differential pressure sensor measuring a differential pressure across the EGR valve, and downstream pressure may be determined by a compressor inlet pressure sensor located at the intake passage at a location downstream of the EGR valve. By measuring EGR flow, temperature, and downstream pressure during closed EGR valve condition at a predetermined DP across the EGR valve, and utilizing the relationship between EGR flow, temperature, opening area, DP, and downstream pressure as discussed above, an effective EGR valve leakage area may be determined.

Upon determining the effective valve leakage area, at 316, an EGR valve area may be corrected based on the determined effective valve leakage area. For example, the determined leakage area may be added to the valve area to correct an effective area of the EGR valve.

Next, at 318, EGR flow may be determined based on a DPOV measurement system, wherein the corrected EGR valve area may be utilized. As discussed above, EGR flow may be determined as a function of (corrected) area of the valve opening, EGR temperature, DP across the valve, and downstream pressure.

In this way, in determining EGR flow based on DPOV measurement system, adjusting the effective EGR valve area based on the effective valve leak area may yield more accurate EGR flow measurements.

Figure 3C:
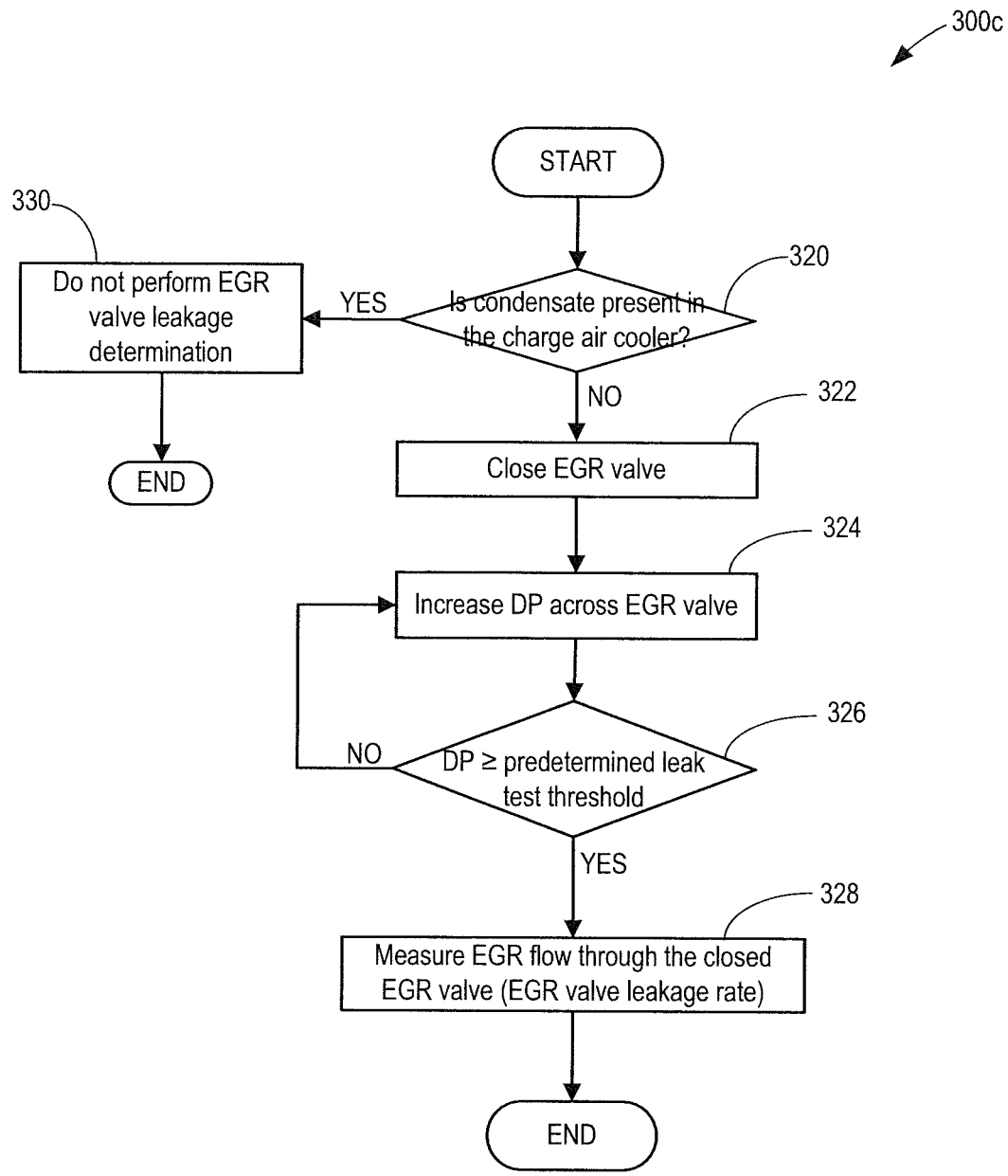
FIG. 3C shows a flowchart illustrating a routine for determining EGR valve leakage rate.

FIG. 3C shows an example routine 300c for determining EGR valve leakage rate. EGR valve leakage may occur due to accumulation of soot at the EGR valve. For example, deposits of high molecular weight components of un-burnt fuel or oil in the exhaust system may cause build-up of soot at the EGR valve. Consequently, EGR valve may not seal completely at closed EGR position, and EGR may leak through the closed EGR valve. In some examples, corrosion of EGR valve may also cause EGR to leak through the EGR valve when it is closed. Therefore, in order to determine more accurate EGR flow rate, it may be important to determine EGR valve leakage rate. EGR valve leakage rate may be determined based on EGR flow estimated by IAO2 sensor measurement system and differential pressure (DP) measured across the EGR valve. As discussed at FIG. 1, IAO2 sensor may be located downstream of a charge air cooler (CAC). Due to the effect of condensation present in the CAC on the IAO2 sensor, EGR valve leakage rate determination may be performed based on absence of condensate in the CAC as described below.

At 320, it may be determined if condensate is present in the charge air cooler. Condensate accumulation model may be applied to determine the presence of condensate in the CAC. In one example, condensate accumulation may be determined based on ambient temperature, ambient humidity, CAC conditions (inlet and outlet temperatures and pressures, flow rate through the CAC, etc.), mass air flow, MAP, engine speed and load, engine temperature, boost, etc In turbocharged engines, the compression of air may cause an increase in air temperature. In order to cool the heated air, a charge air cooler (CAC) may be utilized. During rainy or humid weather conditions, or when the ambient air temperature decreases, condensate may form in the CAC where the intake air is cooled below the water dew point. Condensate may collect at the CAC. During certain air flow conditions, condensate may exit the CAC and enter the intake manifold as water droplets. The condensate may affect the IAO2 sensor located in the intake manifold, downstream of the CAC. Consequently, the IAO2 sensor, when it is used to measure EGR flow, may provide a false EGR reading, and more accurate EGR valve leakage information may not be obtained. Therefore, if it is determined (at 320) that condensate is present in the CAC; the controller may not perform EGR valve leak determination.

If condensate is not detected at the CAC, the routine may proceed to 322. At 322, the controller may close the EGR valve. Next, upon closing the EGR valve, at 324, a differential pressure (DP) may be increased across the EGR valve. AIS throttle, located at the intake passage, may be adjusted to set a desired DP across the EGR valve. For example, an opening of the AIS throttle may be decreased to increase the DP across the EGR valve.

At 326, the controller may determine if the DP is greater than or equal to a predetermined leak test threshold. If no, the routine may continue to increase DP across the EGR valve until the DP is greater than or equal to a predetermined leak test threshold. Upon reaching or exceeding a predetermined leak test threshold, the routine may proceed to 328. At 328, the EGR valve leakage rate may be calculated utilizing IAO2 sensor measurement system. In other words, EGR flow through the closed EGR valve at a predetermined DP across the EGR valve may be measured based on an output from the IAO2 sensor. The IAO2 sensor based EGR measurement system may calculate EGR flow based on one or more outputs from IAO2 sensor, mass air flow sensor, manifold absolute pressure sensor, and manifold temperature sensor. In one example, EGR leakage rate may be calculated at a plurality of predetermined threshold limits, and subsequently an average EGR leakage rate may be calculated.

In one example, as discussed at FIG. 3B, by utilizing the EGR leak rate, amount of EGR valve lift may be determined. By learning the amount of valve lift during closed EGR valve positions, effective EGR valve area may be adjusted to determine more accurate EGR flow. In another example, as discussed at FIG. 3A, if the leakage rate through the EGR valve at closed EGR position is greater than a threshold leakage rate, EGR valve defect may be indicated and additional EGR valve diagnostics may be performed to confirm the EGR valve defect.

In this way, by determining EGR valve leakage rate, more accurate EGR flow measurement and EGR valve diagnostics may be obtained.

During conditions such as (1) when valve lift error is small (that is, when EGR leakage area is small), or (2) when non-uniform soot build-up causes changes in EGR flow rate at different valve lift amounts, EGR flow characteristics for multiple valve lift positions may be learned and based on EGR flow at multiple valve lift positions, a DPOV transfer function may be obtained. The DPOV transfer function may represent EGR flow characteristics at a plurality of valve lift positions ranging from closed EGR valve position to valve lift at a predetermined threshold valve lift. DPOV transfer function determination will be further elaborated at FIG. 4C. Further, in one example, as illustrated at FIG. 4B, change in EGR flow characteristics from nominal EGR flow characteristics may be used to determine change in effective EGR flow area for determining EGR flow measurement by DPOV measurement method. In another example, as illustrated further at FIG. 4A, change in EGR flow characteristics above a threshold change may be utilized for EGR valve diagnostics.

Figure 4A:
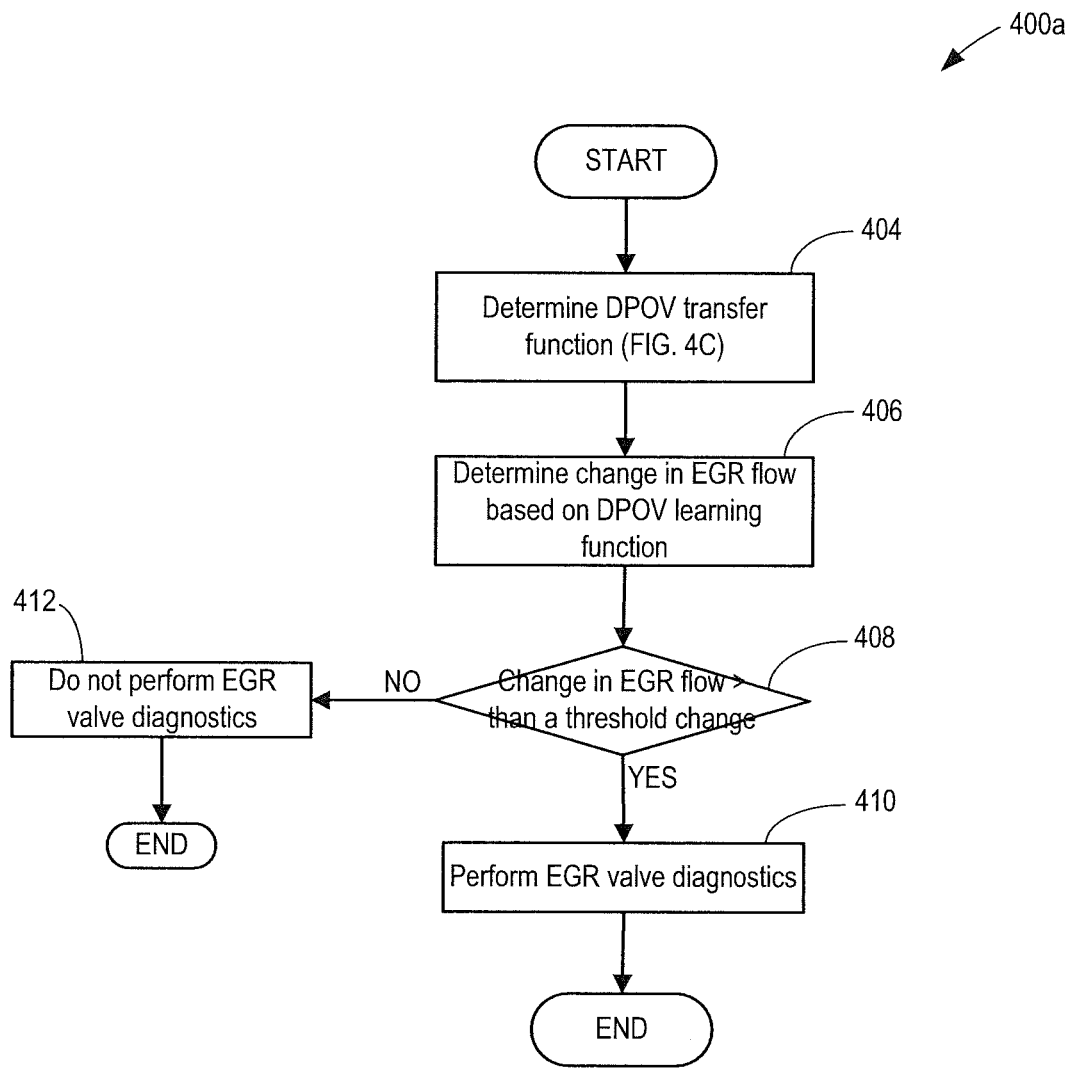
FIG. 4A shows a flowchart illustrating a routine for performing EGR valve diagnostics based on delta pressure over valve (DPOV) transfer function.
Figure 4B:
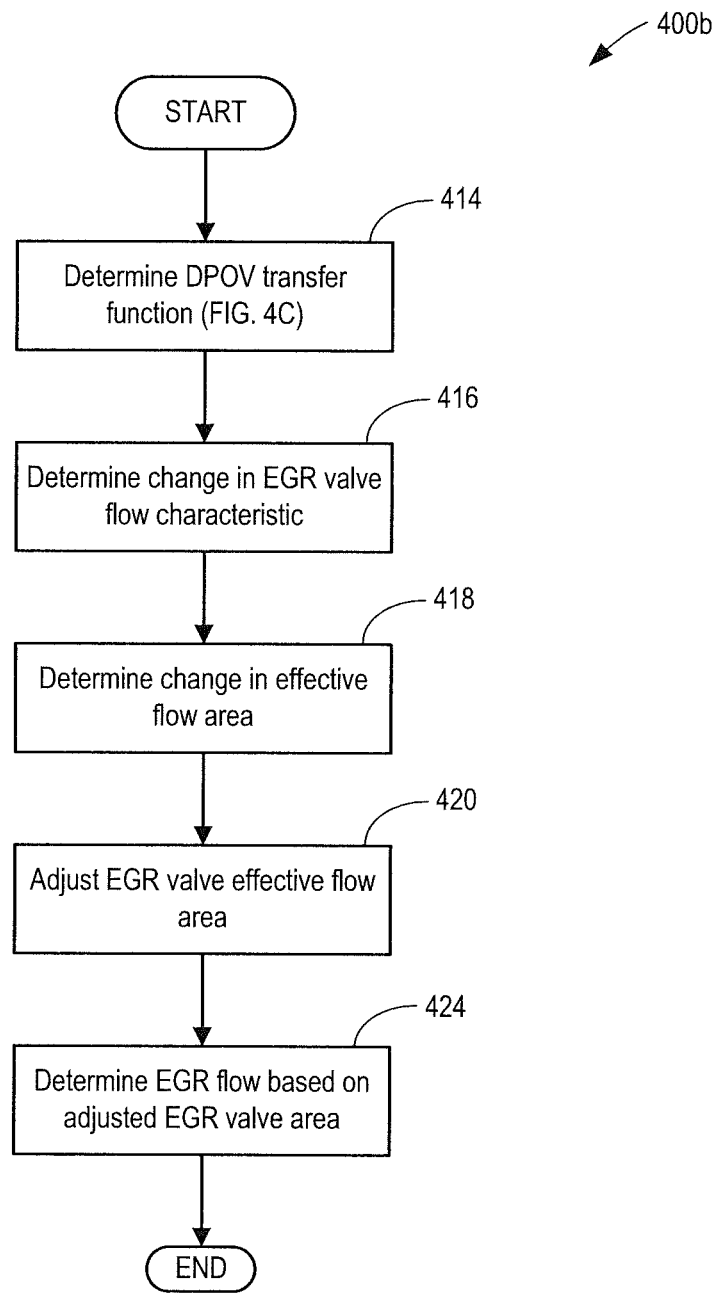
FIG. 4B shows a flowchart illustrating a routine for determining EGR flow based on DPOV transfer function.

Turning to FIG. 4A, it shows an example routine 400a for determining EGR valve defect based on flow characteristics of the EGR valve at multiple valve lift positions.

At 404, DPOV transfer function may be determined based on relationship between EGR flow and valve lift at multiple different valve lift positions for a predetermined DP established across the EGR valve. Determination of DPOV transfer function will be further elaborated at FIG. 4C. Next, at 406, upon determining DPOV transfer function, the routine may determine a change in EGR flow characteristics based on the DPOV transfer function. For example, EGR flow characteristics may be determined based on the DPOV transfer function. The determined EGR flow characteristics may be compared to nominal EGR flow characteristics. A change in EGR flow may be calculated based on differences between the determined EGR flow characteristics and the nominal EGR flow characteristics.

At 408, it may be determined if the change in EGR flow is greater than a threshold change. If yes, the routine may proceed to 410 to perform EGR valve diagnostics in order to determine EGR valve defect. If at 408, the change in EGR flow is not greater than a threshold change, the routine may terminate without performing EGR valve diagnostics.

In this way, change in EGR flow determined based on DPOV transfer function may be utilized for EGR valve diagnostics. By comparing EGR flow characteristics determined based on the DPOV transfer function to nominal EGR flow characteristics of the EGR valve, change in EGR flow characteristics may be learned. In this way, by utilizing DPOV transfer function, more accurate information for EGR valve diagnostics may be obtained.

Next, turning to FIG. 4B, it illustrates a routine 400b for adjusting EGR flow based on learned EGR valve flow area, which may be determined based on DPOV transfer function.

At 414, the controller may determine DPOV transfer function based on EGR flow measured by IAO2 sensor at multiple different valve lift positions. The transfer function may be determined at a predetermined DP established across the EGR valve. Determination of DPOV transfer function will be further described at FIG. 4C. Upon determining DPOV transfer function, at 416, the controller may determine a change in EGR valve flow characteristics. For example, change in EGR valve flow characteristics may be determined based on a difference between determined DPOV transfer function and a nominal transfer function for EGR valve flow. In other words, change in EGR valve flow characteristics may be determined based on a difference between determined EGR flow and nominal EGR flow.

Next, at 418, a change in effective flow area of the EGR valve may be determined. As discussed at FIG. 3B, EGR flow measured by DPOV measurement system may be based on EGR flow area (in other words, valve lift, or valve opening), EGR temperature, DP across the EGR valve, and downstream EGR pressure. Therefore, based on a change in EGR flow, a change in EGR flow area may be determined. For example, due to soot build-up at the EGR valve, effective EGR flow area at a given valve position may decrease and consequently, less EGR flow than is expected may be obtained. Therefore, as the valve effective flow area decreases, for a given desired EGR amount, the control system may command the valve more open than it otherwise would (e.g., in the presence of reduced blockage and larger effective flow area).

Upon determining change in effective flow area, at 420, EGR valve effective flow area may be adjusted. In one example, at a partially-open valve lift position, a change in effective flow area may indicate a decrease in EGR valve effective flow area. For example, during partially-open valve lift conditions, build-up of soot may clog the EGR valve. Consequently, EGR valve effective area may decrease. Therefore, EGR valve effective flow area may be adjusted based on change in effective valve flow area to indicate a decreased effective flow area. In another example, at a closed EGR valve position, a change EGR valve effective flow area may indicate an increased effective flow area. This may occur due to build up soot causing incomplete closure of the EGR valve and consequently, effective flow area may increase. In this case, EGR valve effective flow area may be adjusted to indicate an increased effective flow area.

Next, at 424, upon adjusting the EGR valve effective flow area, the controller may determine EGR flow based on the adjusted EGR valve area. EGR flow may be determined based on DPOV measurement system, wherein the effective valve area utilized in determining EGR flow may be the adjusted EGR valve effective flow area.

In this way, by determining change in effective flow area based on a change in the DPOV transfer function, a change in EGR valve effective flow area may be determined. By correcting the EGR valve area based on the change in EGR valve effective flow area, more accurate EGR flow may be determined.

Figure 4C:
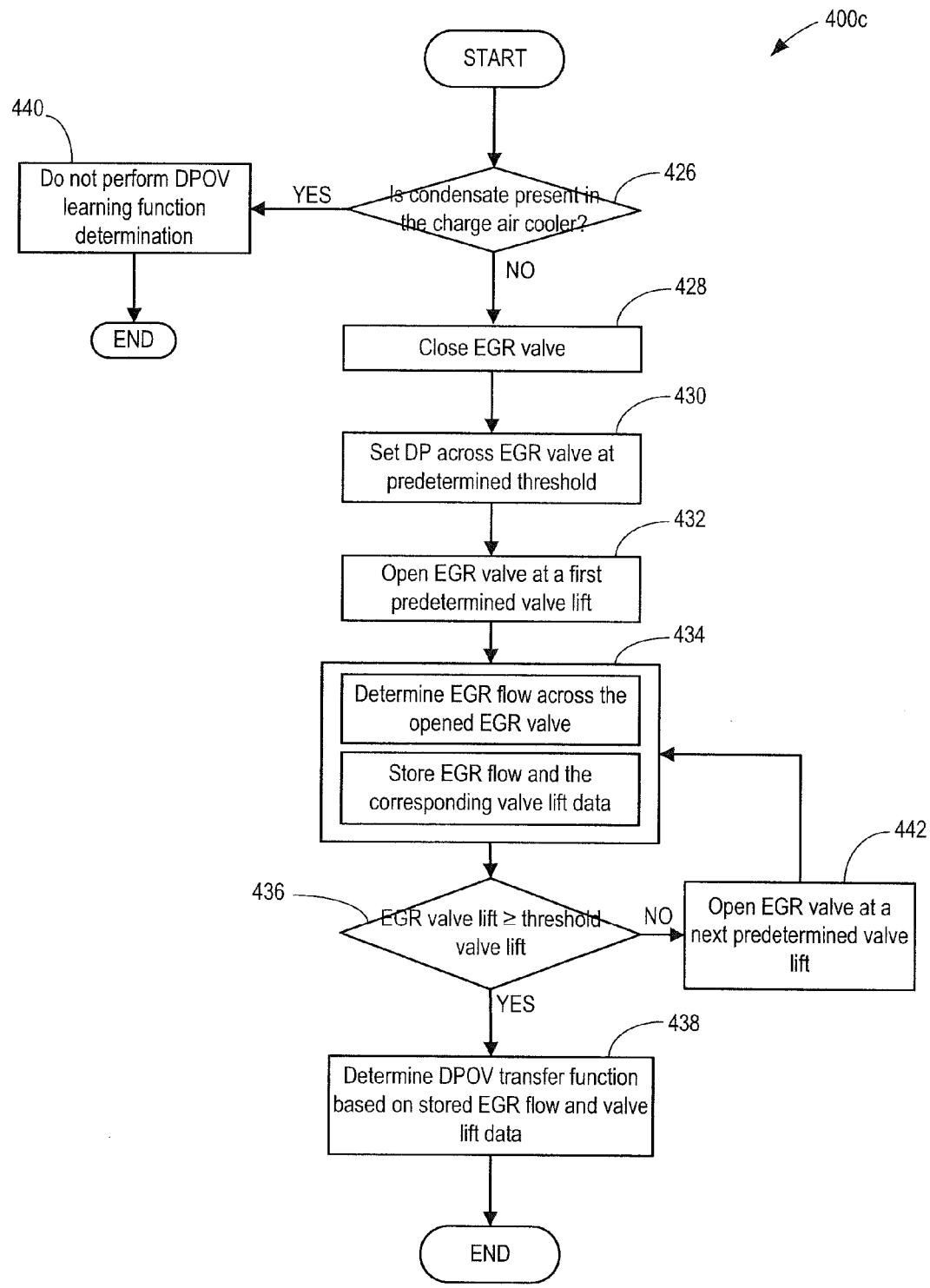
FIG. 4C shows a flowchart illustrating a routine for determining DPOV transfer function.

FIG. 4C shows a flowchart illustrating a routine 400c for determining DPOV transfer function, which may be utilized to determine a change in EGR flow characteristics. Based on the EGR flow change, EGR valve diagnostics may be initiated and/or EGR flow rate may be determined, as described at FIGS. 4A and 4B respectively.

At 426, it may be determined if condensate is present in the charge air cooler. As discussed at FIG. 3C, condensate accumulation model may be applied to determine the presence of condensate in the CAC. In one example, condensate accumulation may be determined based on ambient temperature, ambient humidity, CAC conditions (inlet and outlet temperatures and pressures, flow rate through the CAC, etc.), mass air flow, MAP, engine speed and load, engine temperature, boost, etc.

In turbocharged engines, the compression of air may cause an increase in air temperature. In order to cool the heated air, a charge air cooler (CAC) may be utilized. During rainy or humid weather conditions, or when the ambient air temperature decreases, condensate may form in the CAC where the intake air is cooled below the water dew point. Condensate may collect at the CAC. During certain air flow conditions, condensate may exit the CAC and enter the intake manifold as water droplets. The condensate may impinge on the IAO2 sensor located in the intake manifold, downstream of the CAC. Consequently, the IAO2 sensor, when it is used to measure EGR flow, may provide a false EGR reading, and more accurate EGR valve flow information may not be obtained. Therefore, if it is determined (at 426) that condensate is present in the CAC the controller may not perform DPOV transfer function determination. It is appreciated that if the IAO2 sensor is located upstream of the CAC, step 426 may be omitted.

If condensate is not detected at the CAC, the routine may proceed to 428. At 428, the controller may send signals to the EGR valve to close the EGR valve. Upon closing the EGR valve, the routine may proceed to 430 to establish a differential pressure across the EGR valve at a predetermined threshold level. The DP across the EGR valve may be established by utilizing the AIS throttle located at the intake passage. For example, by decreasing an opening of the AIS throttle, DP across the closed EGR valve may be increased. Therefore, opening of the AIS throttle may be decreased until the DP across the EGR valve reaches a predetermined threshold.

Next, at 432, upon establishing a predetermined DP, the controller may open the EGR valve at a first predetermined valve lift. Next, at 434, EGR flow across the EGR valve may be determined by utilizing an IAO2 sensor measurement system, which is based on output from an IAO2 sensor located at the intake passage. Further, the determined EGR flow data and the corresponding valve lift data may be stored in a PCM data map in memory.

Next, at 436, it may be determined if the current EGR valve lift (that is, the current EGR valve opening) is greater than or equal to a threshold valve lift. If not, the routine may proceed to 442. At 442, the controller may send signals to the EGR valve to increase the valve lift, that is, to further open the EGR valve at a next predetermined valve lift amount. Upon increasing the valve lift amount, the routine may proceed to step 434. As discussed above, at 434, EGR flow may be determined based on an IAO2 sensor based measurement system, and the EGR flow data along with the corresponding valve lift data may be stored in the PCM data map. In this way, EGR valve lift may be increased in a stepwise manner until the EGR valve lift reaches or exceeds a predetermined EGR valve lift limit, and the EGR flow data for each EGR valve lift may be stored. In other words, by varying the EGR valve opening (that is, EGR valve lift), EGR flow data for a plurality of EGR valve lift positions may be determined.

Returning to 436, if it is determined that the EGR valve lift is greater than or equal to a threshold valve lift, the routine may proceed to 438. At 438, a DPOV transfer function may be determined based on the stored EGR flow and valve lift data. In one example, the DPOV transfer function may be determined at each of a plurality of differential pressure threshold levels. Each differential pressure threshold level may be established by adjusting the AIS throttle.

In this way, by determining transfer function based on EGR flow at a plurality of valve lift positions, valve lift error may be determined with greater accuracy. In one example, as discussed above, changes in the DPOV transfer function may be determined based on changes in effective flow area. In another example, changes in the DPOV transfer function may be detected in a similar way during normal operation at known DP and valve lift combinations.

In one example, as discussed at FIG. 3C, EGR valve leakage rate caused by soot build-up and/or corrosion may be determined based on EGR leakage during closed EGR positions. In another example, as discussed at FIG. 4C, in order to account for small changes in EGR flow characteristics, DPOV transfer function may be utilized. In yet another example, a combination of EGR leakage rate determination during closed EGR valve positions, and DPOV transfer function determination may be utilized.

Now turning to FIG. 5, it shows example learning of EGR valve lift determination as described at FIG. 3C and EGR flow determination based on learning of EGR valve lift. Specifically, at graph 500, position of the intake throttle is shown at plot 502, differential pressure is shown at plot 506, a differential pressure threshold is shown at 504, position of the EGR valve is shown at plot 508, EGR valve leakage area is shown at plot 510, EGR flow determined based on IAO2 sensor is shown at plot 512, actual EGR flow is shown at plot 514, and EGR flow determined based on DPOV measurement system is shown at plot 516. The graph is plotted with time along x-axis. Prior to t3, EGR valve lift determination is shown.

In determining EGR valve lift, prior to t1, EGR valve may be commanded closed (plot 508) and DP across the EGR valve may be increased (plot 506) by decreasing the opening of the throttle (plot 506). Due to build-up of soot, EGR valve may not close completely and EGR may leak through the EGR valve leakage area (plot 510). EGR flow (plot 512) leak may be measured based on IAO2 sensor. As the DP increases, EGR flow leaking through the EGR valve may also increase (plot 512). EGR flow measured by DPOV, prior to learning of the valve lift, does not take into account EGR valve leakage area and consequently, increase in EGR flow (that is, EGR leak) through the EGR valve may not be determined by the DPOV measurement system (plot 516). In other words, EGR flow measured by the DPOV measurement system (plot 516) does not represent the actual EGR flow through the closed EGR valve (plot 514).

Between t1 and t2, DP may be further increased by adjusting throttle opening (plot 502) to reach the threshold (plot 506). EGR valve may continue to be commanded in the closed position (plot 508). As the DP is increased EGR flow measured based on output from the IAO2 sensor may also increase (plot 512). Since DPOV measurement system does not account for EGR leakage, no change in EGR flow may be measured by DPOV (plot 516). Whereas, the actual EGR flow (plot 514) may increase as the DP across the EGR valve increases.

At t2, the DP across the EGR valve (plot 506) may reach threshold 504. Between t2 and t3, the DP (plot 506) may be maintained at the threshold level 504. With DP established at a desired threshold level, EGR flow may be measured by the IAO2 sensor based measurement system. EGR valve may be maintained at the commanded closed position (508). At the commanded closed EGR valve position, based on DP across the EGR valve and EGR flow measured based on the IAO2 sensor, EGR valve leakage area may be determined. In this way, effective EGR valve leakage area may be learned. Based on the learned EGR valve leakage area, effective EGR valve area may be adjusted to account for EGR valve leakage. By adjusting the effective EGR valve area, when utilizing the DPOV measurement system, more accurate EGR flow may be determined. In some examples, EGR valve lift may be learned at more than one DP threshold limit and subsequently, an average EGR valve leakage area may be determined. The average EGR valve leakage area may be utilized to adjust the effective EGR valve area for EGR flow measurement by the DPOV measurement system.

By t3, learning of EGR valve lift may be completed and EGR valve leakage area may be determined. At t3, EGR valve may continue to remain commanded closed (plot 508) and DP across the EGR valve (plot 506) may continue to be established at the threshold 504. Upon learning the EGR valve lift and determining EGR valve leakage area prior to t3, at t3, EGR valve area may be adjusted based on the learned EGR valve leakage area. Consequently, EGR flow determined by the DPOV measurement system (plot 516) may indicate EGR flow close to the actual EGR flow (plot 514).

In this way, based on EGR flow through a closed EGR valve at a predetermined threshold DP across the EGR valve, EGR valve leakage and subsequently, EGR valve leakage area may be determined. By incorporating EGR valve leakage area into the effective EGR valve area, more accurate DPOV based EGR flow measurements may be obtained.

FIG. 6 shows example learning of DPOV transfer function as described at FIG. 4C, and EGR flow determination based on the learned DPOV transfer function. Specifically, graph 600 shows position of the intake throttle at plot 602, differential pressure across an EGR valve at plot 606, differential pressure threshold at plot 604, EGR valve position at plot 608, nominal EGR flow (in other words, expected EGR flow) at plot 610, EGR flow measured based on IAO2 sensor output at plot 612, EGR flow measured based on DPOV measurement system at plot 614, and actual EGR flow at plot 616. The graph is plotted with time along x-axis. Learning of EGR flow characteristics by determining DPOV transfer function may be performed prior to t5.

Prior to t1, the EGR valve may be closed (plot 608), and DP across the EGR valve (plot 606) may be increased by decreasing opening of the throttle (plot 602). Due to accumulation of soot the EGR valve may not close completely. Consequently, EGR valve opening area may increase thereby allowing EGR to leak through the EGR valve. Further, as DP increases (plot 606), EGR flow (plot 612) may increase. EGR flow may be measured based on IAO2 sensor output. Prior to determination of DPOV transfer function, information regarding EGR valve lift error may not be available and consequently, effective flow area of the EGR valve may not be adjusted. As a result, EGR flow measurement based on DPOV measurement system may not account for change in EGR valve lift and/or change in EGR flow due to soot build up. Therefore, EGR flow determined by DPOV measurement system (plot 614) may not indicate the actual increase (plot 616) in EGR flow.

At t1, DP across the EGR valve (plot 606) may reach a predetermined threshold 604. Next, between t1 and t2, EGR valve may remain closed (plot 608), and DP (plot 606) may be at predetermined threshold 604. EGR flow determined based on IAO2 sensor measurement system and the corresponding valve lift data may be stored in a PCM data map. Due to EGR leak caused by incomplete valve closure (as a result of soot build-up, for example), EGR flow measured by the IAO2 sensor (plot 612) may be higher than the expected or nominal EGR flow (plot 610). Nominal EGR flow may indicate EGR flow when the EGR valve is free of soot build-up or deposits, and/or corrosion. Prior to learning of DPOV transfer function, DPOV measurement system does not take into account EGR leak. Consequently, EGR flow measured based on DPOV (plot 614) may be lower than the actual EGR flow (plot 616).

Next, between t2 and t3, EGR valve may be partially opened at a first predetermined valve lift amount (plot 608). As EGR valve opening increases, the change in differential pressure may be small or substantially zero (plot 606) and EGR flow may increase (plots 610, 612, 614, and 616). However, soot build-up may clog the EGR valve decreasing the effective EGR valve flow area. Consequently, EGR flow measured based on IAO2 sensor (plot 612) may be lower than the nominal or expected EGR flow (plot 610). EGR flow measured based on IAO2 sensor and the corresponding valve lift may be stored in the PCM data map, which may be used to determine DPOV transfer function. The transfer function may represent EGR valve flow characteristics at various valve lift positions. Further, prior to determination of transfer function, since EGR flow is not corrected for soot build-up, DPOV based EGR flow measurement may be higher than the actual EGR flow.

Between t3 and t4, and between t4 and t5, EGR valve opening may be increased in stepwise manner at increasing predetermined valve lift amounts (plot 608) until a threshold valve opening is reached. As the EGR valve opening increases, differential pressure across the EGR valve may decrease (plot 606), and EGR flow may increase (plots 610, 612, 614, and 616). In the example illustrated herein, EGR flow measured based on IAO2 sensor output (plot 612) may be lower than the nominal EGR flow (plot 610) due to soot build-up. EGR flow measured based on IAO2 sensor reading and the corresponding valve lift data may be stored in the PCM data map for determination of DPOV transfer function. Prior to determination of EGR flow characteristics based on DPOV transfer function, EGR flow measured based on DPOV measurement system may not be corrected for soot accumulation. Consequently, EGR flow measured by DPOV (plot 616) may be higher than actual EGR flow (plot 616).

In the example shown herein, as the EGR valve opening increases, there may be a corresponding decrease in the differential pressure across the EGR valve. Differential pressure may be determined utilizing the DPOV sensor shown at FIGS. 1 and 2. Differential pressure measured may indicate a pressure difference between an upstream region of the EGR valve and a downstream region of the EGR valve. In some examples, in determining the EGR flow at different EGR valve lifts, differential pressure may be maintained at the predetermined threshold level. For example, between t1 and t2, t2 and t3, and t3 and t4, as the EGR valve is opened in increasing predetermined valve lift amounts, differential pressure may be maintained at the threshold level. This may be accomplished by adjusting the throttle to maintain the differential pressure at the threshold level. For example, as the EGR valve opening is increased, the differential pressure across the valve may decrease. In order to maintain the differential pressure at the predetermined threshold level, AIS throttle may be adjusted. That is, as the EGR valve opening is increased, AIS throttle opening may be decreased to bring the differential pressure back to the threshold level.

Next, at t5, EGR valve opening may be at threshold level. EGR flow data at different valve lift amounts ranging from closed EGR position to threshold EGR valve lift amounts determined prior to t5 may be stored in the PCM data map. At t5, based on the EGR flow data measured based on IAO2 sensor and the corresponding valve lift amount, a DPOV transfer function representing EGR flow characteristics at different valve lift amounts may be calculated. Further, a change in the transfer function may be determined based on the difference between the EGR flow measured based on IAO2 sensor and the nominal EGR flow. Therefore, a change in transfer function may indicate a change in flow characteristics of the EGR valve. Based on the change in transfer function, a change in effective flow area of the EGR valve may be determined. Based on the determined change in effective flow area of the EGR valve, EGR flow measured based on DPOV may be adjusted. In this way, by learning the changes in flow characteristics of the EGR valve at different valve lift positions, more accurate DPOV based EGR flow measurements may be determined.

Between, t5 and t6, the learned changes in EGR flow may be applied to adjust effective EGR flow area in DPOV based EGR flow measurements. Therefore, the EGR flow (plot 614 after t5-measured based on DPOV) may be closer to the actual EGR flow (plot 616) than when the DPOV based EGR flow was measured before learning the EGR flow for different valve lifts, determining the DPOV transfer function and applying the learned transfer function change. In other words, the error between EGR flow determined based on DPOV measurement system and the actual EGR flow may be reduced. In this way, DPOV transfer function may be determined based on EGR flow at different EGR valve lift positions. Based on a change in DPOV transfer function from a nominal transfer function, change EGR flow characteristics and subsequently, change in effective EGR flow area may be determined. By applying the learned change in effective EGR flow area to DPOV based EGR flow determination, more accurate EGR flow measurement may be obtained. Particularly, if soot build up or valve lift error is small, learning EGR flow characteristics at a plurality of valve lift positions as described at FIGS. 4C and 6, enables robust DPOV based EGR measurements.

Soot accumulation at the EGR valve is utilized to illustrate the examples described herein at FIGS. 5 and 6. In some other examples, changes in EGR flow may occur due to, for example, corrosion at the EGR valve. In such cases as well, as described at FIGS. 5 and 6, learning of EGR valve lift and DPOV transfer function may be applied to determine more accurate DPOV based EGR flow measurements.

Turning to FIG. 7, it shows a flowchart illustrating a routine 700 for utilizing learned EGR flow correction to provide desired EGR during engine operation. Routine 700 may be performed during conditions when EGR flow error learning is not performed. For example, error in EGR flow may be learned during routine maintenance, periodic intrusive testing, or during prior normal operating conditions suitable for learning. Based on the learned errors in EGR flow measurement, a desired EGR may be provided during non-learning engine operation conditions. The learning of EGR flow correction may be performed as discussed at FIGS. 3C and 4C.

At 702, engine operating parameters may be measured and/or estimated. Engine operating parameters may include, for example, engine speed, load, mass air flow, manifold absolute pressure, manifold temperature, engine coolant temperature, barometric pressure, catalyst temperature, etc. At 704, based on one or more engine operating parameters, a desired EGR flow may be determined. Next, at 706, EGR flow may be determined based on DPOV measurement system as described at FIG. 2. In determination of EGR flow measurement by DPOV method, a learned correction factor based valve leakage area (as described at FIG. 3B) and/or change in effective flow area (as described at FIG. 4B) may be applied to determine more accurate EGR flow measurement. In other words, EGR flow measurement may be determined based on adjusted valve area, the adjustment applied based on learned valve leakage area and/or change in effective flow area as described at FIGS. 3B and 4B respectively.

Upon determining EGR flow, at 708, an error between the desired EGR flow and the measured EGR flow may be estimated. Next, at 710, EGR flow may be corrected to provide the desired EGR flow by adjusting an EGR valve opening. In one example, the learned EGR flow correction factor determined based on valve leakage area and/or the change in effective flow area (as discussed at FIGS. 3B and 4B) may be applied to adjust the EGR valve opening. A Proportional-Integral-Derivative (PID) controller may be used to control the EGR valve based on the learned EGR flow correction, and error calculated between desired EGR flow and measured EGR flow. The EGR flow correction learning may be performed by determining EGR valve leakage rate (as discussed at FIG. 3C), and/or DPOV transfer function (as discussed at FIG. 4C).

In this way, by adjusting EGR valve based on the learned EGR flow correction to provide a desired EGR, more accurate EGR flow adjustments may be achieved and consequently, error between the desired flow and the measured EGR flow may be reduced.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-3, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   closing an exhaust gas recirculation (EGR) valve;
   reducing an intake throttle opening until a differential pressure across the closed EGR valve reaches a threshold; and
   while the differential pressure is maintained, learning an EGR leakage flow correction based on intake oxygen, and adjusting the EGR valve during open EGR valve operation based on operating parameters and the EGR leakage flow correction.

2. The method of claim 1 further comprising estimating a first EGR mass flow based on the intake oxygen at the EGR valve differential pressure, and estimating an EGR leak area based on the first EGR mass flow.

3. The method of claim 2 further comprising correcting an effective EGR valve area based on the EGR leak area and adjusting the EGR valve based on the effective EGR valve area to provide a desired EGR amount.

4. The method of claim 3 further comprising correcting a second EGR mass flow based on the corrected effective EGR valve area, the second EGR mass flow determined based on the differential pressure.

5. The method of claim 2 wherein the first EGR mass flow estimation is further based on a mass air flow, a manifold absolute pressure, and a manifold temperature.

6. The method of claim 2 further comprising performing EGR valve diagnostics based on the first EGR mass flow being greater than a leakage threshold.

7. The method of claim 4 wherein the second EGR mass flow determination is based on the effective EGR valve area, an EGR temperature, a pressure downstream of the EGR valve, and the differential pressure across the EGR valve.

8. The method of claim 2 wherein the first EGR mass flow is estimated at a plurality of EGR valve differential pressures.

9. The method of claim 8 wherein the EGR leak area is determined based on an average of the first EGR mass flow estimated at the plurality of EGR valve differential pressures.

10. A method for an engine, comprising:
    establishing a differential pressure across an EGR valve;
    varying an EGR valve opening;
    estimating a first EGR mass flow at each EGR valve opening;
    learning a transfer function based on the first EGR mass flow and the corresponding EGR valve opening; and
    adjusting the EGR valve opening based on an effective EGR valve flow area responsive to the transfer function,
    wherein the first EGR mass flow is estimated based on an intake oxygen sensor.

11. The method of claim 10 further comprising correcting a second EGR mass flow based on the effective EGR valve flow area.

12. The method of claim 11 wherein the second EGR mass flow determination is based on the effective EGR valve flow area, an EGR temperature, a pressure downstream of the EGR valve, and the differential pressure across the EGR valve.

13. The method of claim 10 wherein the EGR valve is closed prior to the varying, and where the estimating occurs while maintaining the differential pressure across the EGR valve.

14. The method of claim 10 wherein the EGR valve differential pressure is adjusted by varying an intake throttle.

15. The method of claim 10 further comprising determining a change in EGR mass flow based on the transfer function and a nominal transfer function.

16. The method of claim 15 further comprising performing EGR valve diagnostics based on the change in EGR mass flow being greater than a threshold change.

17. A system, comprising:
    an engine with exhaust gas recirculation (EGR) including an EGR valve;
    an intake throttle upstream of an EGR inlet in an intake system; and
    a controller with memory including instructions to adjust intake throttle opening to maintain a differential pressure across the EGR valve while it is closed while learning an EGR valve leakage flow correction based on intake oxygen, and storing the correction in memory.

18. The system of claim 17 wherein the EGR is low pressure EGR.

19. The system of claim 18 wherein the EGR is on only one bank of a V-engine.

* * * * *